(12) United States Patent
Chen

(10) Patent No.: US 8,496,295 B2
(45) Date of Patent: Jul. 30, 2013

(54) ROTARY ELBOW WITH DOUBLE SHAFT

(76) Inventor: Chao-Ken Chen, Changhua Conuty (TW)

(*) Notice: Subject to any disclaimer, the term of this patent is extended or adjusted under 35 U.S.C. 154(b) by 330 days.

(21) Appl. No.: 12/954,674

(22) Filed: Nov. 25, 2010

(65) Prior Publication Data

US 2011/0181090 A1 Jul. 28, 2011

(30) Foreign Application Priority Data

Jan. 22, 2010 (TW) ................................ 99201269 U

(51) Int. Cl.
*A47C 7/54* (2006.01)

(52) U.S. Cl.
USPC ............. 297/411.31; 297/411.35; 297/411.37

(58) Field of Classification Search
USPC ............. 297/411.31, 411.35, 411.36, 411.37, 297/411.38, 411.33; 248/118
See application file for complete search history.

(56) References Cited

U.S. PATENT DOCUMENTS

| | | | | |
|---|---|---|---|---|
| 6,017,091 A * | 1/2000 | Cao | ........................... | 297/411.37 |
| 8,016,360 B2 * | 9/2011 | Machael et al. | ......... | 297/411.37 |
| 8,104,837 B2 * | 1/2012 | Diffrient | .................. | 297/411.37 |

* cited by examiner

*Primary Examiner* — Anthony D Barfield

(57) ABSTRACT

A chair elbow capable of rotating with double shaft is disclosed. Two bearings are disposed on a mount board fixed on a chair. Each of the bearings connects one end of each of two rotating plates, while the other ends thereof are pivotally connected in a linear slot of a seat plate used for securing an armrest. The length of the slot is longer than the distance between the two bearings, and the latter is longer than the length of the rotating plates. Thus, the armrest on the seat plate can rotate against the mount board with 360 degrees and move forward and backward.

10 Claims, 7 Drawing Sheets

ROTARY ELBOW WITH DOUBLE SHAFT

BACKGROUND OF THE INVENTION

1. Technical Field

The invention generally relates to chairs, particularly to elbows of chairs.

2. Related Art

General chairs are usually equipped with fixed elbows whose height and position can not be adjusted for matching various users. Latterly, chairs with rotary elbows appear in the market. The rotary elbows allow horizontal rotation for satisfying various requirements of users. Such an elbow can provide better support to users to avoid aches and pains of hands and ill posture of bodies. However, because conventional rotary elbows adopt a single rotating shaft, the elongated elbows rotating around a single bearing can not maintain a stably planar rotation, and the bearing is easily damaged by unbalanced pressure.

SUMMARY OF THE INVENTION

An object of the invention is to provide a rotary elbow with double shaft, which can stably support an armrest to rotate and enhance fixation strength of the armrest to avoid damage resulting from unbalanced pressure.

To accomplish the above object, the invention disposes two bearings on a mount board fixed on a chair. Each of the bearings connects one end of each of two rotating plates, while the other ends thereof are pivotally connected in a linear slot of a seat plate used for securing an armrest. The length of the slot is longer than the distance between the two bearings, and the latter is longer than the length of the rotating plates. Thus, the armrest on the seat plate can rotate against the mount board with 360 degree and move forward and backward.

DETAILED DESCRIPTION OF THE INVENTION

Figure 1:
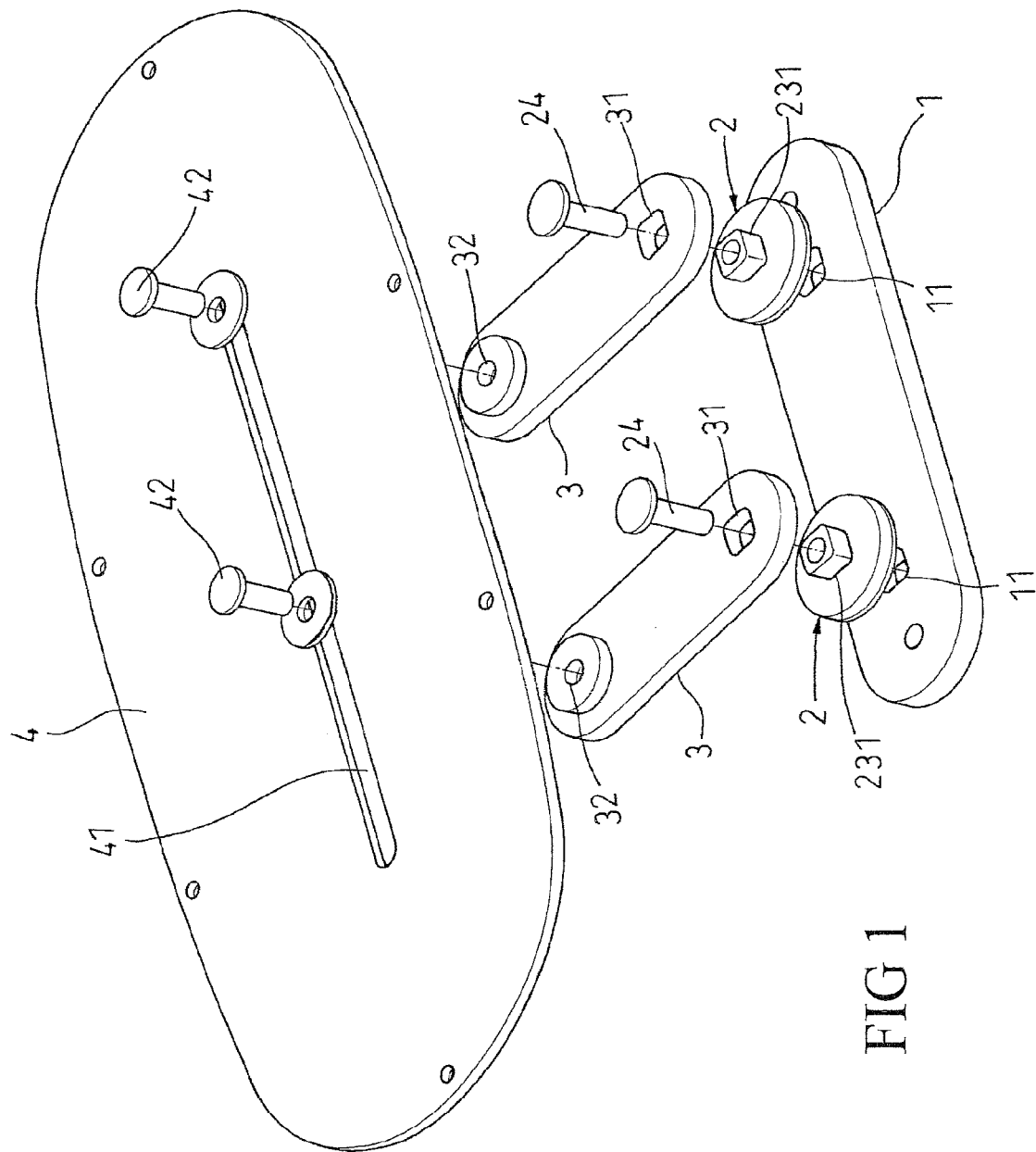
FIG. 1 is a perspective exploded view of the invention.

FIG. 1 is an exploded perspective view of the invention. Two bearings 2 are disposed on an elongated mount board 1. The two bearings 2 are provided with two pivot seats 231, 213 axially aligning with each other (please further refer to FIG. 6). The mount board 1 is fixed on a chair for supporting an armrest 5. Each of the bearings 2 is embedded in a mounting hole 11 of the mount board 1 with one pivot seat 213 thereof, while the other pivot seat 231 is embedded in a connecting hole 31 in one end of an elongated rotating plate 3. A fastening rod 24 penetrates the mounting hole 11, bearing 2 and connecting hole 31 for pivotally connecting the rotating plate 3 with the mount board 1. Thus the rotating plates 3 can separately rotate on the mount board 1 by means of the bearings 2. And the length of the rotating plate 3 is shorter than the distance of the two bearings 2 thereby the rotating plates 3 can freely rotate not to be blocked by the bearings 2.

The other end of the rotating plate is provided with a pivot hole 32. A seat board 4 having a linear slot 41 is used for fixing an armrest. Two pivot shafts 42 separately penetrate the slot 41 and pivot holes 32 to form a pivotal connection. The length of the slot 41 is longer than the distance of the two bearings 2, thereby the seat board 4 can linearly move forward and backward under orientation of the pivot shafts 42 and slot 41.

Figure 2:
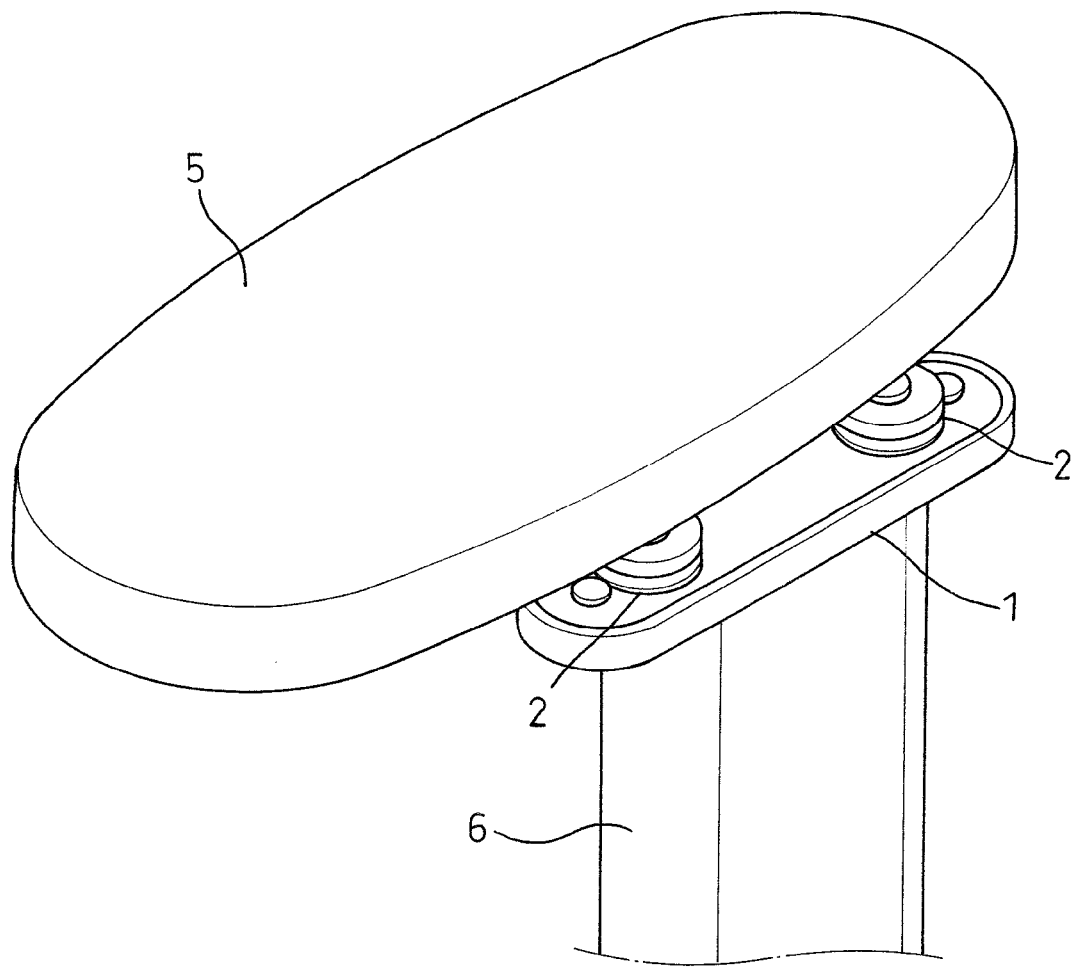
FIG. 2 is a perspective assembled view of the invention.
Figure 3:
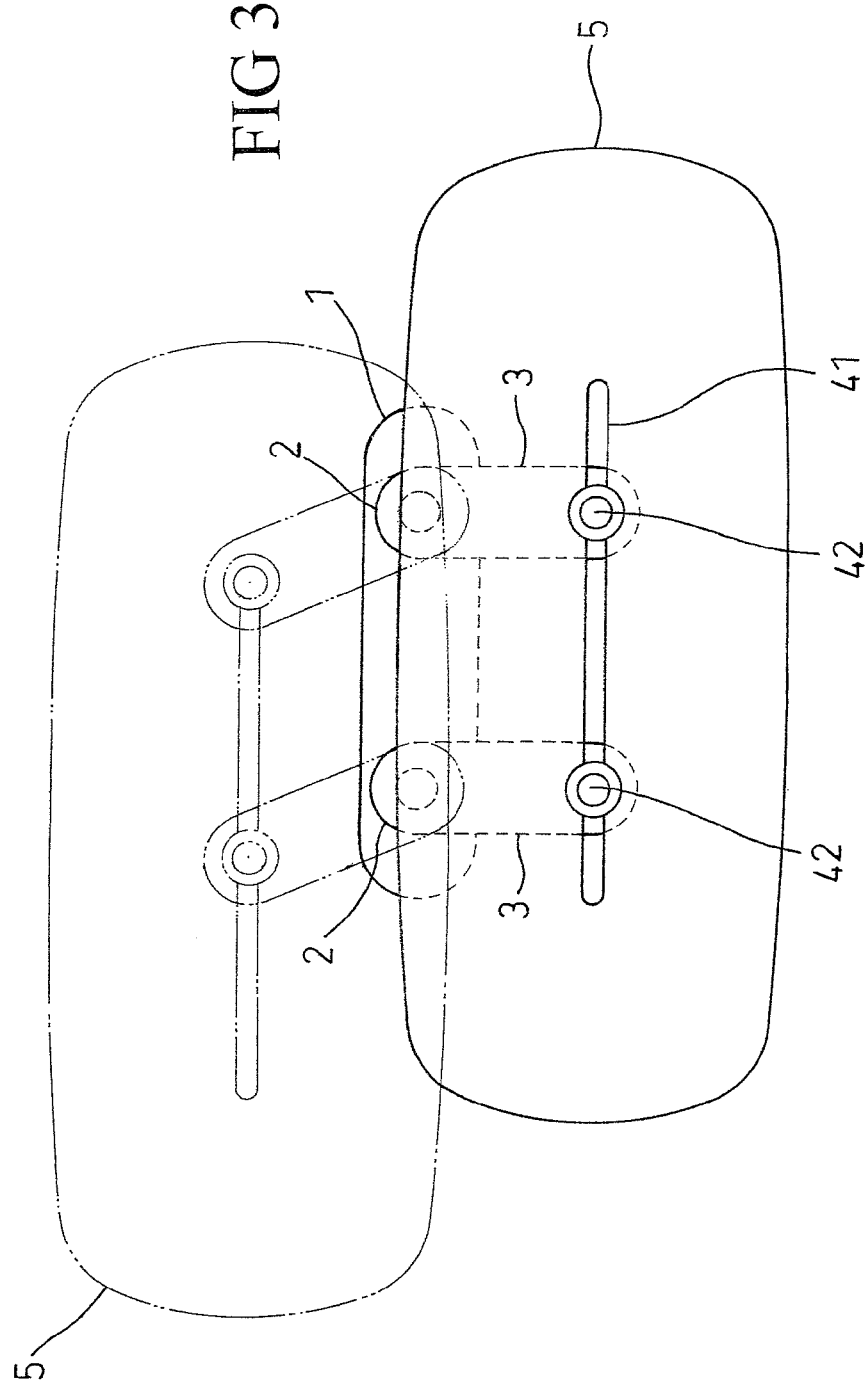
FIG. 3 shows the rotation of the armrest.
Figure 4:
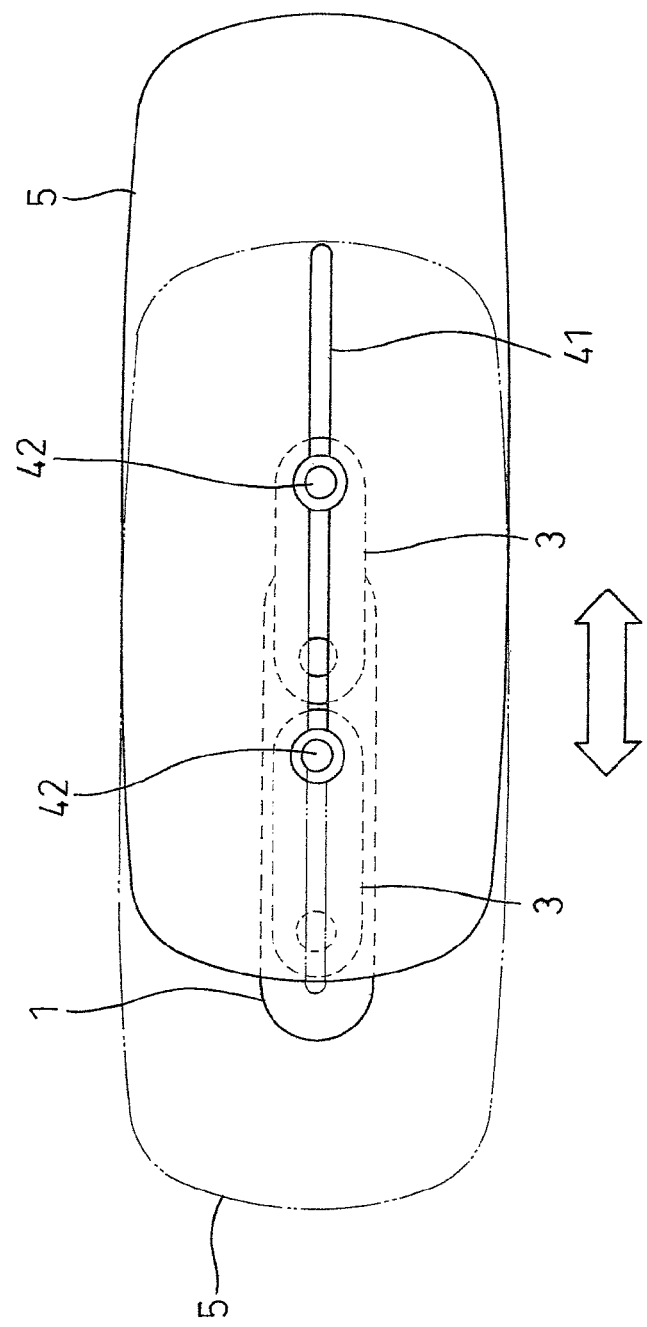
FIG. 4 shows the forward and backward move of the armrest.
Figure 5:
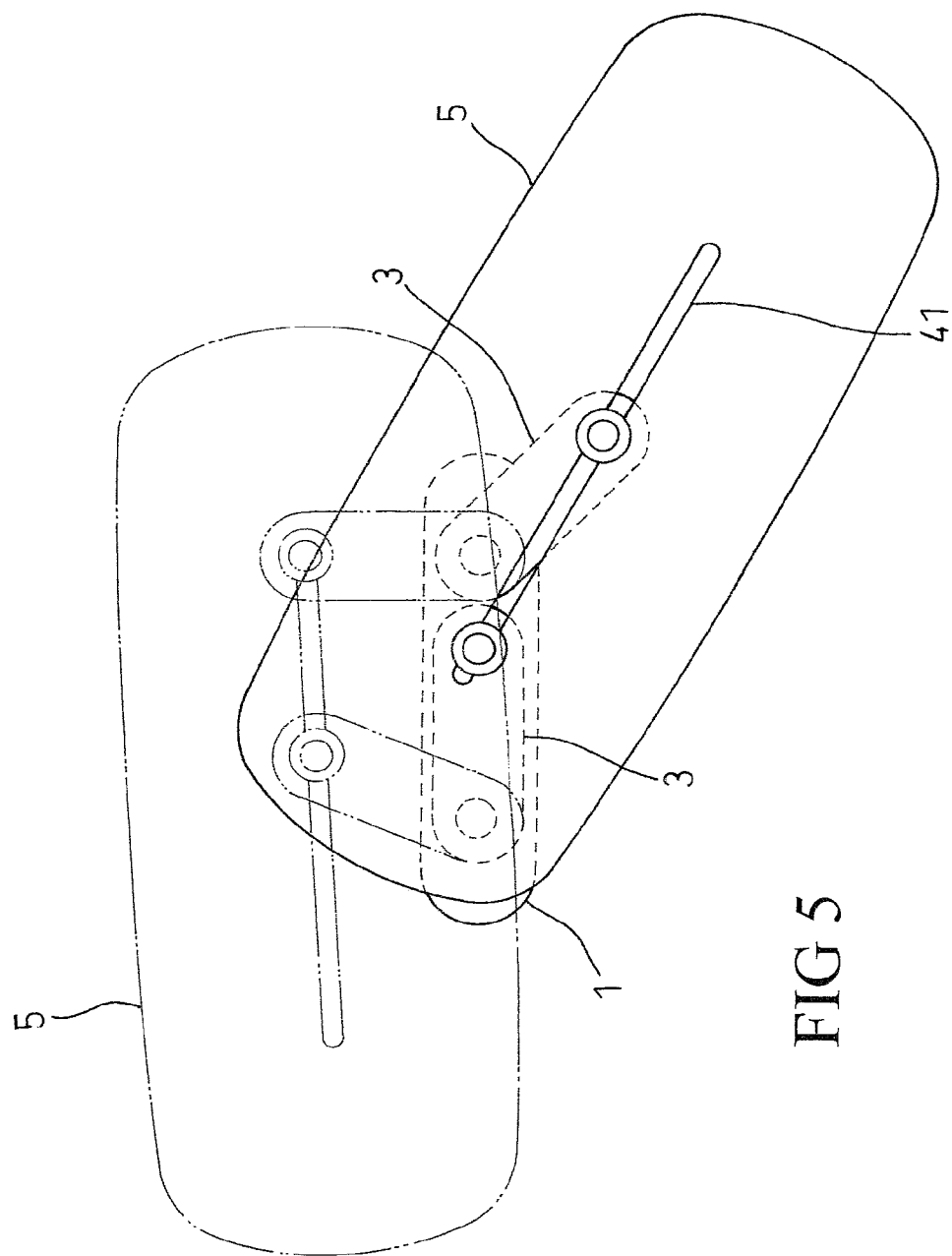
FIG. 5 shows the deflective move of the armrest.

FIG. 2 shows an assembled status of the invention. As can be seen in this figure, the mount board 1 is mounted on an elbow 6 and an armrest 5 is mounted on the seat board 4. Thus, the armrest 5 can rotate by means of the bearings 2 and move forward and backward by means of the slot 41 and pivot shafts 42 as shown in FIGS. 3 and 4. When the two rotating plates 3 are parallel, the armrest 5 also can maintain a direction parallel to the mount board 1. However, the armrest 5 can be deflected by asymmetrically rotating the two rotating plates 3, i.e., the rotating plates 3 are not parallel as shown in FIG. 5. Thus, the armrest 5 can be both radially 360-degree rotated and linearly move forward and backward. And the double shaft structure further provides firm support.

Figure 6:
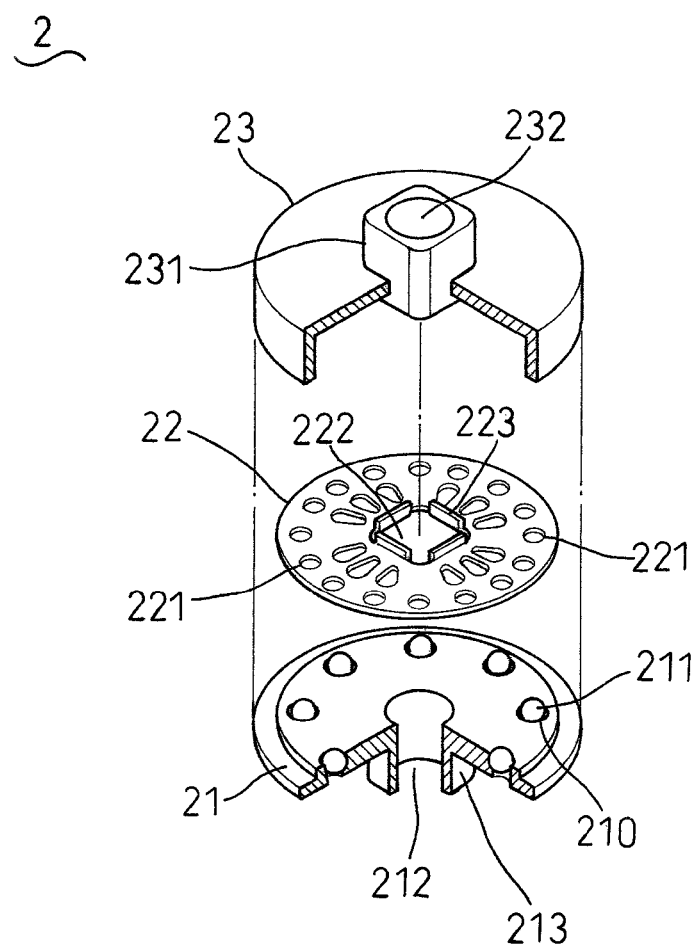
FIG. 6 is an exploded view of the positionable bearing.

Preferredly, the bearings 2 are positionable ball bearings with a multiple positioning function. As can be seen in FIG. 6, the positionable ball bearing 2 is composed of a round seat 21, a flexible depressor 22 and a cap 23. The round seat 21 is provided with a plurality of rolling balls 211. The rolling balls 211 are disposed in an annular arrangement with an identical pitch. The rolling balls 211 are rotarily disposed on the round seat 21 with exposure of about one second of volume. A first shaft base 213 is protrudent from a center of the round seat 21. The first shaft base 213, whose outline may be a cuboid or many-sided body, has a first shaft hole 212 therein. The flexible depressor 22 is a round disk. And a through hole 222 is provided at its center. The flexible depressor 22 is provided with circular holes 221 corresponding to the rolling balls 211. The circular holes are the same as or an integer multiple of the rolling balls 211 in number. As can be seen in FIG. 6, the quantity of the circular holes 221 is two times of the rolling balls 211 for forming more compact positioning points. That is to say, the pitch of any two adjacent positioning points is one second of that of the rolling balls 211. The pitch of any two adjacent positioning points is just the same as that of the rolling balls 211 if the circular holes 221 are the same as the rolling balls 211 in number. Besides, the inner diameter of the circular hole 221 is slightly smaller than the outer diameter of the rolling ball 211 so that the rolling balls can be embedded in the circular holes 221 to make positioned.

The flexible depressor 22 is disposed on the rolling balls 211 to press them. The cap 23 covers the round seat 21 to accommodate the flexible depressor 22 therein. A second shaft base 231, whose outline may be a cuboid or many-sided body, is disposed at the center of the cap 23 and extends inwards and outwards. The inward part of the second shaft base 231 penetrates into the through hole 222 of the flexible depressor 22 to secure the flexible depressor 22. The cap 23 and flexible 22 can be integrated because of the non-round shape of the second shaft base 231. The second shaft base 231 is provided with a second shaft hole 232 therein. The first shaft hole 212, through hole 222 and second shaft hole 232 directly communicate with each other to be penetrated by a fastening rod 24. Bending edges 223 extend from margins of the through hole 222 of the flexible depressor 22 to lean against the cap 23 for supporting the deformed flexible depressor 22.

Figure 7:
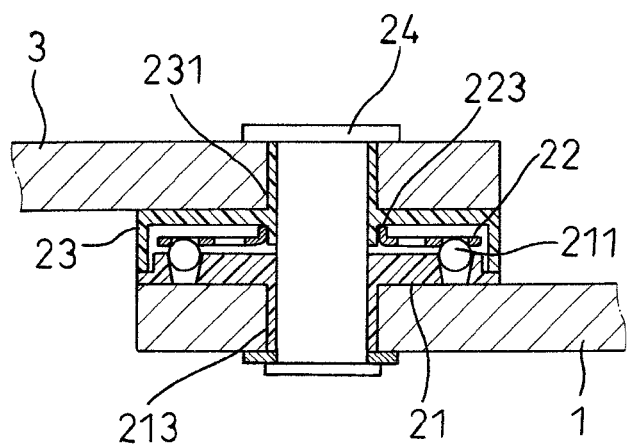
FIG. 7 is a sectional view of the positionable bearing in a positioned status.
Figure 8:
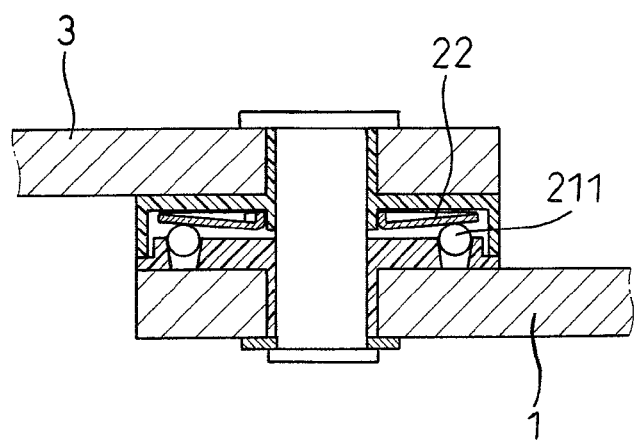
FIG. 8 is a sectional view of the positionable bearing in a rotating status.

FIG. 7 is a cross-sectional view of the ball bearing 2 in the positioned status. The flexible depressor 22 presses the round seat 21. A positioned status is made once the rolling balls are embedded into the circular holes 221. When the cap 23 is forced to rotate with the flexible depressor 22 against the round seat 21, as shown in FIG. 8, the rolling balls 211 diverge from the circular holes to rotate. And the flexible depressor 22 is deformed by being leaned by the rolling balls 211 (the central portion of the flexible depressor 22 is leaned by the bending edges 223 so it is not deformed). At this time, though the rolling balls 211 are pressed by the flexible depressor 22, they still can rotate. This makes the flexible depressor 22 also can rotate smoothly. When the rolling balls 211 move to the position of the circular holes 221 again, they will be automatically embedded into the circular holes 221 to make another positioned status by means of pressure from the flexible depressor 22. Meanwhile the flexible depressor 22 restores its original shape.

By employing the above positionable ball bearing, the armrest 5 can be automatically positioned at several positions. Thus the armrest 5 can maintain a specific position without arbitrarily rotation. It is much more convenient than before.

It will be appreciated by persons skilled in the art that the above embodiments have been described by way of example only and not in any limitative sense, and that various alterations and modifications are possible without departure from the scope of the invention as defined by the appended claims.

What is claimed is:

1. A rotary elbow of chair comprising:
  a mount board;
  two bearings, each having a first pivot seat and a second pivot seat axially aligning with each other, and the two first pivot seats being separately fixed at two ends of the mount board;
  two rotating plates, one end of each of which fixedly connects one of the second pivot seats; and
  a seat board having a linear slot, two pivot shafts penetrating the slot to pivotally connect the other end of each of the rotating plates;
  thereby the rotating plates can rotate on the mount board about the bearings.

2. The rotary elbow of chair of claim 1, wherein the mount board is provided with two mounting holes for separately being embedded by the first pivot seats of the bearings, and each the rotating plate is provided with a connecting hole for being embedded one of the second pivot seats.

3. The rotary elbow of chair of claim 1, further comprising two fastening rods separately penetrating the rotating plates, the bearings and mount board.

4. The rotary elbow of chair of claim 1, wherein a length of each the rotating plate is shorter than a distance of the two bearings and a length of the slot is longer than the distance of the two bearings.

5. The rotary elbow of chair of claim 1, wherein the other end of each the rotating plate is provided with a pivot hole, and two pivot shafts separately penetrate the slot and pivot holes to form a pivotal connection, thereby the seat board can linearly move forward and backward under orientation of the pivot shafts and slot.

6. The rotary elbow of chair of claim 3, wherein at least one of the bearings comprises:
  a round seat, provided with a plurality of rolling balls in an annular arrangement with an identical pitch, wherein the round seat has a first shaft base protrudent from a center thereof and a first shaft hole is disposed in the first shaft base;
  a flexible depressor, being a round disk on the round seat, having a through hole at a center thereof, and being provided with circular holes corresponding to the rolling balls; and
  a cap covering the round seat to accommodate the flexible depressor therein, wherein the cap has a second shaft base at a center thereof for penetrating into the through hole to secure the flexible depressor, the second shaft base is provided with a second shaft hole therein and the first shaft hole, the through hole and the second shaft hole directly communicate with each other;
  wherein the flexible depressor presses the round seat, a positioned status can not be formed until the circular holes are embedded by the rolling balls, when the cap is forced to rotate with the flexible depressor against the round seat, the rolling balls diverge from the circular holes to rotate and the flexible depressor is deformed by being leaned by the rolling balls, and when the rolling balls move to a position of the circular holes again, they will be automatically embedded into the circular holes to make another positioned status by means of pressure from the flexible depressor.

7. The rotary elbow of claim 6, wherein the circular holes are the same as the rolling balls or an integer multiple of the rolling balls in number.

8. The rotary elbow of claim 6, wherein an outline of the second shaft base is a many-sided body.

9. The rotary elbow of claim 8, wherein the second shaft base extends from the cap inwards and outwards, and an inward part of the second shaft base penetrates into the through hole.

10. The rotary elbow of claim 9, further comprising bending edges extending from margins of the through hole of the flexible depressor for leaning against the cap.

* * * * *